United States Patent Office 3,824,186
Patented July 16, 1974

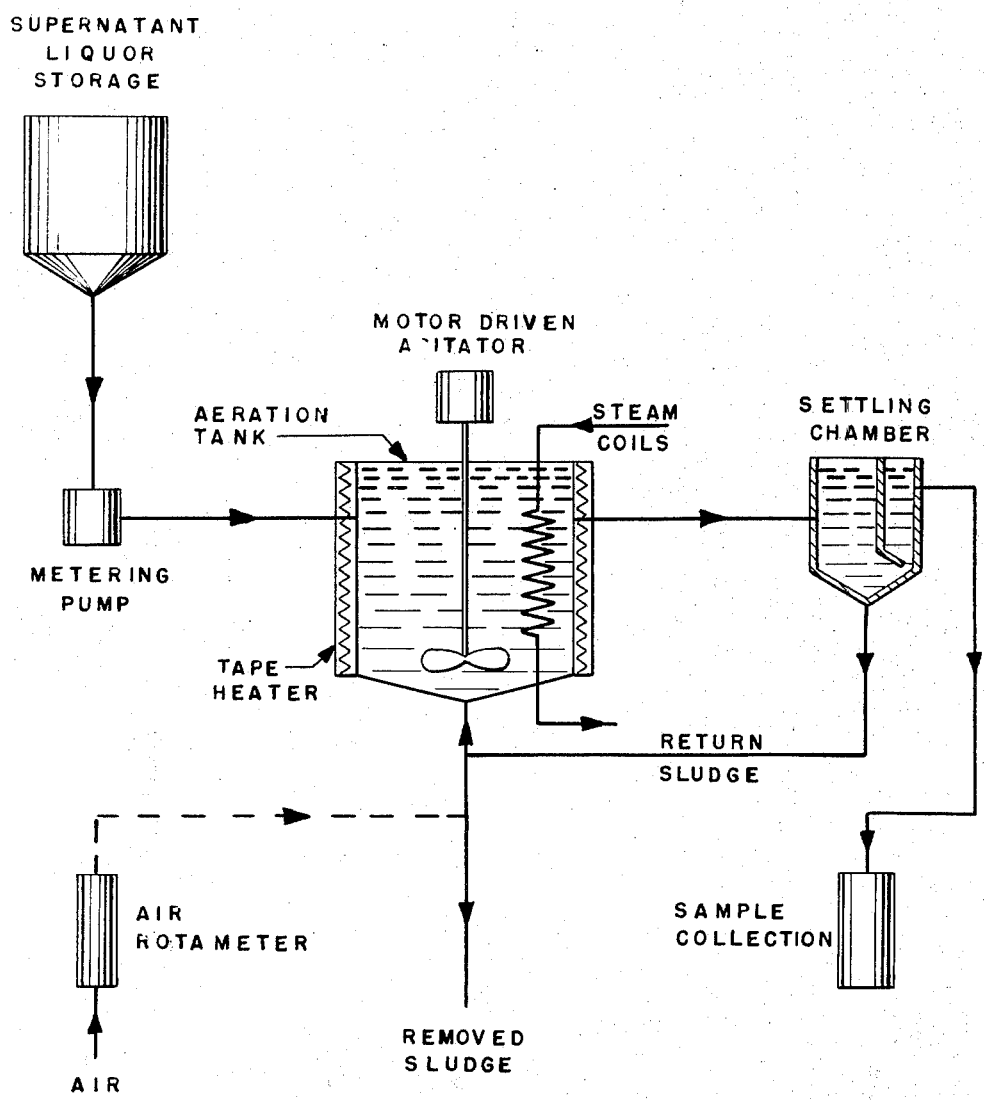

---

3,824,186
BIOTREATMENT PROCESS
Allen H. Erickson, Wausau, Edmunds M. Pogainis, Mosinee, and Gerald H. Teletzke, Wausau, Wis., assignors to Sterling Drug Inc., New York, N.Y.
Continuation-in-part of abandoned application Ser. No. 48,070, June 22, 1970. This application Jan. 24, 1972, Ser. No. 219,948
Int. Cl. C02c 1/06
U.S. Cl. 210—7                                    5 Claims

ABSTRACT OF THE DISCLOSURE

The liquors obtained by dewatering thermally conditioned organic sludge are subjected to separate biotreatment in undiluted form, thereby removing more than 90% of the biological oxygen demand from the liquors. The biotreatment is carried out in an aeration vessel containing biological sludge.

---

This application is a continuation-in-part of our prior copending application, Ser. No. 48,070, filed June 22, 1970, now abandoned.

This invention relates to the treatment of organic waste materials, and in particular is concerned with the biological treatment of thermally conditioned sludge liquors.

The liquors obtained by dewatering thermally conditioned organic sludges, especially sewage sludge, although relatively small in volume, contain dissolved organic solids which exert a large biological oxygen demand (BOD), and their purification and disposal present problems in the design of waste treatment plants. Normally these liquors are recycled to the sewage treatment plant influent for dilution with raw sewage and subsequent biological treatment by conventional means.

Biotreatment systems of conventional sewage treatment plants, wherein the sewage is highly diluted, employ loading rates in the range of 0.2 to 0.75 kilograms of biological oxygen demand per day per kilogram of mixed liquor volatile suspended solids. The state of the art in this respect is delineated in a publication by T. R. Haseltine [Biological Treatment of Sewage and Industrial Wastes; papers presented at the Conference of Biological Waste Treatment at Manhattan College, April 1955, Vol. 1 (Rheinhold), Editors, Joseph McCabe and W. W. Eckenfelder, pp. 257–270] wherein it is shown that in the conventional biotreatment of activated sludge with loading rates ranging from 1 to 5 mass units of BOD per mass unit of sludge solids, the BOD removed ranges from 75% down to about 50%, the BOD removal efficiency decreasing with increasing loading rate. The author therefore recommends that the maximum BOD loading rate should not exceed 0.5 mass unit per day per mass unit of mixed liquor solids.

In cases where sludge liquors have been subjected to aeration treatment without dilution (e.g. Sontheimer et al. U.S. Pat. 3,300,401) the loading rates were low, generally less than 0.5 mass unit of BOD per day per mass unit of mixed liquor solids, and the BOD removal far less than the 90% or more removal realized by the process of the present invention.

In contrast to the teachings of the prior art, it has now been found possible to subject the liquors obtained from thermally conditioned sludges to separate biotreatment in undiluted form at a high loading rate of 1.0 to 5.0 kg. of BOD per kg. of mixed liquor volatile suspended solids, while at the same time effecting BOD removals in excess of 90%. Surprisingly, it has also been calculated that the separate biotreatment of the concentrated liquors is more economically efficient than to recycle the liquors back to the main sewage inlet for conventional aeration.

As shown on the flow sheet of the accompanying drawing, the process of the present invention is accomplished by carrying out the following steps:

(a) feeding the liquors to an aeration vessel containing a previously acclimated biological sludge, the loading rate of the liquors to the aeration vessel being between 1.0 and 5.0 kg. of biological oxygen demand per kg. of mixed liquor volatile suspended solids;

(b) agitating the mixture in the vessel for a period in excess of two hours with an oxygen containing gas while there is maintained a dissolved oxygen content sufficient to support aerobic biological growth;

(c) passing said mixture to a settling tank to separate accumulated biological sludge;

(d) recycling the settled biological sludge to the aeration tank; and (e) removing from the aeration tank biological sludge at a rate approximately equivalent to the rate of accumulation of the biological sludge.

The liquors to be processed are obtained by heat treatment or wet air oxidation of organic sludges by methods known in the art; cf. U.S. Pats. 2,277,718, 2,847,379, 3,155,611, 3,272,739, 3,272,740, 3,359,200. The liquors arise from decanting, draining, or dewatering the thermally conditioned sludges by vaccum filtration, centrifuging, gravity settling, filter presses or other dewatering means.

The liquors are continuously fed into the aeration vessel and continuously conveyed therefrom to the settling tank at such a rate of flow that the residence time in the aeration tank is at least two hours. The oxygen containing gas, preferably ordinary air, is added at a rate sufficient to maintain a dissolved oxygen content adequate to support aerobic biological growth. This can conveniently be accomplished using a mechanical turbine aerator.

The temperature in the aeration vessel is maintained in the range between 25 and 40° C. The temperature can be regulated by an electrical heater or device such as steam coils exemplified in the accompanying drawing, or by reclaiming waste heat in the thermally conditioned sludge by passing the liquors to be biotreated in indirect heat exchange with the thermally conditioned sludge.

In situations where the phosphorus content of the supernatant liquors to be biotreated is not sufficient to support biological growth (for example, where the presence of metal ions in the sludge causes precipitation of phosphates or in high oxidation systems where phosphorus is precipitated out of the sludge stream) it is necessary to add supplemental phosphorus for nutrition such that the carbon to phosphorus ratio is maintained at approximately 100:1. The supplemental phosphorus can be supplied by adding phosphorus containing compounds, for example, potassium dihydrogen phosphate, or by adding raw sewage or waste biological sludge from the main sewage treatment process.

The following examples will further illustrate the invention without the latter being limited thereby.

EXAMPLE 1

Biotreatment of Low Pressure Oxidation Liquors

A mixture of primary and biological activated sludge was subjected to wet air oxidation at 22.1 kg./cm.$^2$ pressure and 177° C. for a period of 55 minutes, such that 16.1% of the organic matter was oxidized.

After allowing the mixture to cool and settle for 4 hours, decantate was drawn off having the following analysis:

|  | Mg./liter |
|---|---|
| $BOD_5$ | 5,580 |
| COD (chemical oxygen demand) | 11,430 |

The decantate liquors were pumped continuously at a constant rate of 605 liters/day to a temperature-controlled 190 liter reactor held at 36.1° C. Residence time in the reactor was 7.5 hours. The reactor was equipped with a submerged agitator and a pipe which dispersed compressed air immediately below the agitator.

The reactor was previously seeded with activated sludge and acclimated to sludge liquors, developing a viable biological mass.

Air was continuously added at 31 liters per minute, and 26% of the oxygen in the air was absorbed by the biological solids. The resulting oxygen transfer coefficient $K_La$ was 139 mg. oxygen transferred per hour per liter per mg./l. dissolved oxygen deficit.

The biological sludge and liquors were conveyed continuously from the reactor to a settling tank where the sludge solids settled out and were recycled to the aerated reactor. By removing a portion of the biological solids daily, the concentration of solids in the reactor (mixed liquor volatile suspended solids) was maintained at 4,400 mg./l. The loading rate was 4.06 kg. $BOD_5$ per day per kg. mixed liquor volatile suspended solids.

The treated and settled liquors were continuously removed from the settling tank, flowing over a weir. The analysis of the liquors was:

|  | Mg./l. |
|---|---|
| $BOD_5$ | 276 |
| COD | 3,870 |

The reduction in liquor $BOD_5$ was 95.1%, and in COD, 66.2%. The new biological sludge which was produced amounted to 0.743 kg. per kg. of $BOD_5$ removed from the liquors.

EXAMPLE 2

Biotreatment of Heat Treatment Liquors

A mixture of primary and biological activated sludge was subjected to heat treatment (no oxidation) at 22.1 kg./cm.$^2$ pressure and 177° C. for a period of 50 minutes.

After allowing the mixture to cool and settle for 4 hours, decantate was drawn off having the following analysis:

|  | Mg./l. |
|---|---|
| $BOD_5$ | 3,200 |
| COD | 7,070 |

The decantate liquors were pumped continuously at a constant rate of 269 liters/day to the reactor of Example 1, which had been previously seeded and acclimated to sludge liquors, and held at 31.8° C. The residence time in the reactor was 16.9 hours.

Air was continuously added at 6.8 liters/minute; 31% of the oxygen in the air was absorbed by the biological solids. The resulting oxygen transfer coefficient $K_La$ was 37.3 mg. oxygen transferred per hour per liter mg./l. dissolved oxygen deficit.

The biological sludge and liquors were conveyed continuously from the reactor to a settling tank where the sludge solids settled out and were recycled to the reactor. A portion of the biological solids was removed daily, thus maintaining the mixed liquor volatile suspended solids concentration in the reactor at 2,500 mg./l. The loading rate was 1.82 kg. $BOD_5$ per day per kg. mixed liquor volatile suspended solids.

The treated and settled liquors which were continuously removed from the settling tank had the following analysis:

|  | Mg./l. |
|---|---|
| $BOD_5$ | 73 |
| COD | 1,010 |

The reduction in liquor $BOD_5$ was 97.7% and in COD, 85.7%. Biological solids production was 0.479 kg. per kg. of $BOD_5$ removed from the liquors.

EXAMPLE 3

Biotreatment of High Oxidation Liquors

A mixture of primary and biological activated sludge was subjected to wet air oxidation at 127 kg./cm.$^2$ pressure and 260° C. for a period of 56 minutes, such that 70% of the organic matter was oxidized.

After allowing the mixture to cool and settle for 12 hours, decantate was drawn off having the following analysis:

|  | Mg./l. |
|---|---|
| $BOD_5$ | 4,800 |
| COD | 8,430 |
| Phosphorus | 21 |

The decantate liquors were pumped continuously at a constant rate of 446 liters/day to the temperature-controlled 190 liter reactor of Example 1 held at 34.3° C. The residence time in the reactor was 10.2 hours. The reactor had been previously seeded and the biological solids acclimated to sludge oxidation liquors.

The liquor contained insufficient phosphorus for maintaining the maximum metabolic rate of the biological solids. Therefore, a solution of monobasic potassium phosphate ($KH_2PO_4$) was also pumped continuously into the liquor entering the reactor, thereby increasing the phosphorus content of the liquor to 41 mg./l.

Air was continuously added at 19 liters/minute; 27% of the oxygen in the air was absorbed by the biological solids. The resulting oxygen transfer coefficient $K_La$ was 103 mg. oxygen transferred per hour per liter per mg./l. dissolved oxygen deficit.

The biological sludge and liquors were conveyed continuously from the reactor to a settling tank where the sludge solids settled out and were recycled to the aerated reactor. By removing a portion of the biological solids daily, the concentration of solids in the reactor (mixed liquor volatile suspended solids) was maintained at 4,800 mg./l. The loading rate was 2.35 kg. $BOD_5$ per day per kg. mixed liquor volatile suspended solids.

The treated and settled liquors were continuously removed from the settling tank, flowing over a weir. The analysis of the liquors was:

|  | Mg./l. |
|---|---|
| $BOD_5$ | 345 |
| COD | 2,080 |

The reduction in liquor $BOD_5$ was 92.8% and in COD, 75.5%. Production of biological solids was 0.333 kg. per kg. of $BOD_5$ removed from the liquors.

We claim:

1. A process for biologically treating the undiluted liquors obtained from the dewatering of thermally conditioned sewage sludge solids comprising the steps of:
   (a) establishing a separate aeration vessel and settling tank system for the treatment of the liquors;
   (b) feeding only the liquors to the aeration vessel containing a previously acclimated biological sludge, the loading rate of the liquors to the aeration vessel being between 1.0 and 5.0 kg. of biological oxygen demand per kg. of mixed liquor volatile suspended solids;
   (c) agitating the mixture in the vessel at a temperature in the range between 25° and 40° C. for a period in excess of two hours with an oxygen containing gas while there is maintained a dissolved oxygen content sufficient to support aerobic biological growth and until at least 90% of the biological oxygen demand has been removed from the liquors;
   (d) passing said mixture to the settling tank to separate accumulated biological sludge;
   (e) recycling the settled biological sludge to the aeration vessel;
   (f) removing from the aeration vessel biological sludge at a rate approximately equivalent to the rate of accumulation of the biological sludge; and (g) disposing of the treated liquors from the settling tank.

2. A process according to Claim 1 in which the liquors to be processed are obtained from heat treatment of sewage sludges.

3. A process according to claim 1 in which the liquors to be processed are obtained from wet air oxidation of sewage sludges.

4. A process according to Claim 1 in which supplemental phosphorus is added to maintain maximum biological growth rates, such that the carbon to phosphorus ratio is approximately 100:1.

5. A process according to Claim 1 in which the temperature is controlled by reclaiming waste heat in the thermally conditioned sludge by passing the liquors to be biotreated in indirect heat exchange with the thermally conditioned sludge.

References Cited

UNITED STATES PATENTS

| | | | |
|---|---|---|---|
| 3,256,179 | 6/1966 | Teletzke et al. | 210—10 X |
| 3,300,401 | 1/1967 | Sontheimer et al. | 210—5 |
| 3,401,139 | 9/1968 | Pruessner et al. | 210—7 |
| 3,649,531 | 3/1972 | Brown et al. | 210—10 |
| 3,697,417 | 10/1972 | Teletzke et al. | 210—10 |
| 2,539,004 | 9/1944 | Schlenz et al. | 210—4 |
| 3,272,740 | 9/1966 | Gitchel et al. | 210—12 X |

OTHER REFERENCES

Babbit, H. E.: *Sewerage and Sewage Treatment*, 6th edition, 1947, John Wiley & Sons, pp. 454–5.

THOMAS G. WYSE, Primary Examiner

U.S. Cl. X.R.

210—10

UNITED STATES PATENT OFFICE
CERTIFICATE OF CORRECTION

Patent No. 3,824,186          Dated July 16, 1974

Inventor(s) Allen H. Erickson, Edmunds M. Pogainis & Gerald H. Teletzke

It is certified that error appears in the above-identified patent and that said Letters Patent are hereby corrected as shown below:

Column 6, line 6 (References Cited), "3,401,139" should read --3,401,113--; line 9 (References Cited), "2,539,004" should read --2,359,004--.

Signed and sealed this 3rd day of December 1974.

(SEAL)
Attest:

McCOY M. GIBSON JR.
Attesting Officer

C. MARSHALL DANN
Commissioner of Patents